United States Patent
Cronin

(10) Patent No.: US 8,117,934 B2
(45) Date of Patent: Feb. 21, 2012

(54) TRANSMISSION SHIFT MECHANISM WITH SINGLE-END ACTUATION

(75) Inventor: Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1004 days.

(21) Appl. No.: 11/878,474

(22) Filed: Jul. 25, 2007

(65) Prior Publication Data
US 2008/0047381 A1 Feb. 28, 2008

Related U.S. Application Data

(60) Provisional application No. 60/840,459, filed on Aug. 28, 2006.

(51) Int. Cl.
*F16H 59/00* (2006.01)
*B60K 17/10* (2006.01)
*F01B 7/00* (2006.01)
*F01B 1/00* (2006.01)

(52) U.S. Cl. ............ 74/335; 74/473.11; 92/62; 91/170 R

(58) Field of Classification Search ............ 74/335, 74/473.11; 92/13.4, 62, 65, 31, 33, 75; 91/170 R, 91/173, 176
See application file for complete search history.

(56) References Cited

U.S. PATENT DOCUMENTS

| | | | |
|---|---|---|---|
| 2,575,982 A * | 11/1951 | Stevens | 137/596.1 |
| 3,673,926 A | 7/1972 | Mohri | |
| 3,696,897 A | 10/1972 | Kitano et al. | |
| 4,593,606 A * | 6/1986 | Klatt et al. | 92/52 |
| 4,676,114 A | 6/1987 | Ida et al. | |
| 5,125,326 A | 6/1992 | Sarcona | |
| 5,483,796 A * | 1/1996 | Ando | 60/560 |
| 5,661,998 A * | 9/1997 | Genise | 74/335 |
| 5,669,265 A * | 9/1997 | Adler | 74/335 |
| 5,816,131 A * | 10/1998 | Tornatore | 91/169 |
| 6,343,537 B1 * | 2/2002 | Iida et al. | 92/13.1 |
| 6,397,698 B1 * | 6/2002 | Kamiya et al. | 74/473.11 |
| 6,474,214 B2 | 11/2002 | Takeuchi et al. | |
| 6,484,600 B1 | 11/2002 | Bennett et al. | |
| 6,766,710 B2 | 7/2004 | Reul et al. | |

FOREIGN PATENT DOCUMENTS

| | | |
|---|---|---|
| DE | 102 55 396 | 6/2004 |
| EP | 0 108 572 | 5/1984 |
| EP | 0 789 171 | 8/1997 |
| FR | 1108736 | 1/1956 |
| FR | 1504870 | 12/1967 |
| GB | 888036 | 1/1962 |

(Continued)

*Primary Examiner* — Roger Pang
(74) *Attorney, Agent, or Firm* — Finnegan, Henderson, Farabow, Garrett & Dunner LLP

(57) ABSTRACT

A shift mechanism for a transmission having a first and a second combination of gears is disclosed. The shift mechanism has a rod member and a hydraulic actuator operatively connected to an end of the rod member. The hydraulic actuator is configured to move the rod member between a first position at which the first combination of gears is engaged to transmit power, a second position at which the second combination of gears is engaged to transmit power, and a third position at which neither the first nor the second combination of gears is engaged to transmit power. The hydraulic actuator has a first piston slidably connected to the rod member, a second piston fixedly connected to the rod member, and a housing. The housing forms three chambers and has only two fluid conduits in communication with the three chambers.

18 Claims, 3 Drawing Sheets

FOREIGN PATENT DOCUMENTS

| | | |
|---|---|---|
| GB | 983271 | 2/1965 |
| GB | 1061175 | 3/1967 |
| JP | 59-43205 | 3/1984 |
| JP | 2004-60752 | 2/2004 |
| WO | WO 2004/053338 A1 | 6/2004 |

* cited by examiner

TRANSMISSION SHIFT MECHANISM WITH SINGLE-END ACTUATION

RELATED APPLICATIONS

This application is based on and claims the benefit of priority from U.S. Provisional Application No. 60/840,459, filed Aug. 28, 2006, the contents of which are expressly incorporated herein by reference.

TECHNICAL FIELD

The present disclosure relates generally to a transmission shift mechanism and, more particularly, to a three-position transmission shift mechanism having single-end actuation.

BACKGROUND

Machines such as, for example, wheel loaders, on and off-highway trucks, motor graders, and other heavy construction and mining machines are used to perform many tasks. To effectively perform these tasks, the machines require a power source that provides significant power through a transmission to one or more ground engaging devices. The transmission must provide a range of gearing in order to allow the machine to work at different speeds while keeping the engine operating within a desired operating range. For this purpose, the machines typically include a multi-speed transmission connected to the engine via a torque converter.

To generate the wide range of gearing required by the machine, the multi-speed transmission includes a plurality of intermeshing gears and a corresponding shift mechanism also commonly known as a shift yoke or rod. Each of the gears have different numbers of teeth and the output gear ratio or speed of the transmission depends on the combination of engaged gears. The shift mechanism is used to selectively engage predetermined combinations of gears that result in a desired output ratio. For example, the shift mechanism is typically movable between three positions, namely from a first position at which a first combination of gears is selected to produce a first output gear ratio (e.g., high speed), to a second position at which no gears are engaged (e.g., neutral), and to a third position at which a second combination of gears is selected to produce a second output gear ratio (e.g., low speed).

Shift mechanisms of the type described above are typically hydraulically actuated to move between the three positions. Specifically, each shift mechanism includes a first hydraulic actuator located at one end, and a second hydraulic actuator located at a second end. To initiate movement of the shift mechanism to the first position, the first hydraulic actuator is filled with a pressurized fluid while the second hydraulic actuator remains empty or is drained of the pressurized fluid. To initiate movement of the shift mechanism to the third position, the second hydraulic actuator is filled with a pressurized fluid, while the first hydraulic actuator remains empty or is drained of the pressurized fluid. To initiate movement of the shift mechanism to the second position, pressurized fluid may be drained from both the first and second hydraulic actuators, allowing one or more biasing springs to move the shift mechanism to the second position. Unfortunately, because of the multiple actuators located at both ends of the shift mechanism and because of the use of biasing springs, this configuration is complex, expensive, and unreliable.

One attempt to simplify the shift mechanism design described above and improve transmission reliability is described in U.S. Pat. No. 6,484,600 (the '600 patent) to Bennett et al. In particular, the '600 patent describes a transfer case having an actuator located at only one end of a shift rod. The actuator consists of a pair of pistons, including a connected piston (e.g., a piston fixedly connected to the shift rod) and a free piston (e.g., a piston free to slide along the shift rod). The pair of pistons divide a bore into three separate chambers selectively supplied with compressed air via three separate fluid connections to move the shift rod between high speed, low speed, and neutral. The opposing end of the shift rod is free to move within a blind bore.

In order to achieve high speed, compressed air is supplied to the first two of the three chambers, but not to the third. This causes the fixed piston, free piston, and shift rod to move in one direction until the shift rod reaches a stop and the correct combination of high speed gears are engaged. To achieve low speed, compressed air is supplied to the third chamber, but not the first two. This causes the fixed piston, free piston, and shift rod to move in a second direction opposite the first until the shift rod again reaches a stop and the correct combination of low speed gears are engaged. To achieve neutral, compressed air is supplied to only the second chamber. This causes the fixed piston and shift rod to move to a position midway between the two stopped positions where no gears are engaged.

Although the transfer case of the '600 patent may have fewer components than the typical two actuator design, it may still be complex, expensive, and unreliable. Specifically, the transfer case still requires too many fluid supply connections and, because a valve element must be associated with each supply connection to selectively control the flow of compressed air thereto, the component cost of the transfer case may be excessive. Further, these additional components increase the control complexity and decrease the reliability of the transfer case. In addition, because the neutral position is achieved based solely on a balance of pressure without any hard stops, malfunction (e.g., the undesired engagement or partial engagement of gears) may be possible.

The disclosed transmission is directed to overcoming one or more of the problems set forth above.

SUMMARY OF THE INVENTION

In one aspect, the present disclosure is directed to a shift mechanism for a transmission having a first combination of gears and a second combination of gears. The shift mechanism includes a rod member and a hydraulic actuator operatively connected to an end of the rod member. The hydraulic actuator is configured to move the rod member between a first position at which neither the first nor the second combination of gears is engaged to transmit power, a second position at which the first combination of gears is engaged to transmit power, and a third position at which the second combination of gears is engaged to transmit power. The hydraulic actuator includes a first piston slidably connected to the rod member, a second piston fixedly connected to the rod member, and a housing configured to receive the first and second pistons to form three chambers. The housing has only two fluid conduits in communication with the three chambers.

In another aspect, the present disclosure is directed to a method of changing output gear ratios of a transmission. The method includes pressurizing a fluid and directing the pressurized fluid via only one supply connection to a single actuator. The direction of pressurized fluid achieves any one of a first engaged gear combination and a second engaged gear combination.

DETAILED DESCRIPTION

Figure 1:
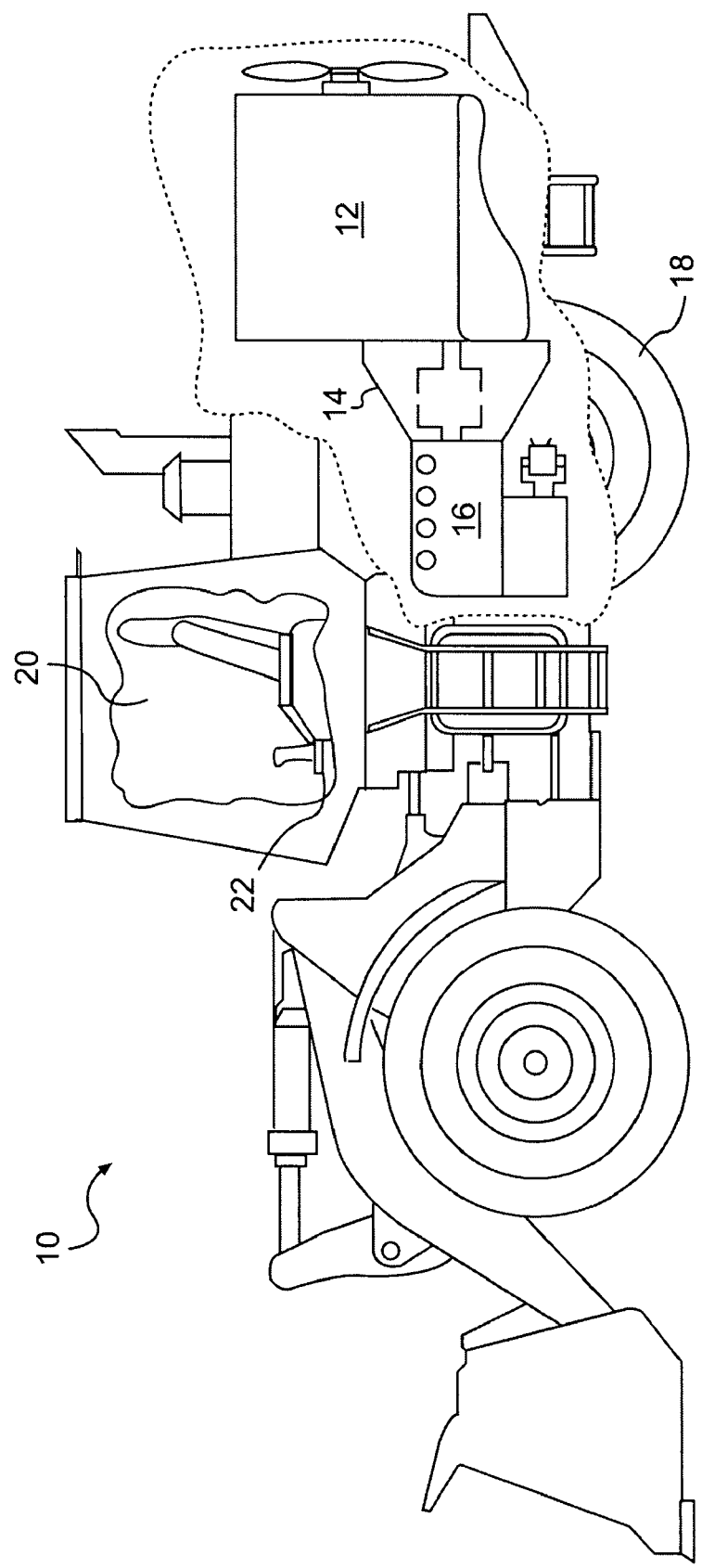
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine such as a wheel loader, an off-highway truck, a motor grader, or any other earth moving machine. Machine 10 may alternatively be a marine vessel, a passenger vehicle, or any other suitable operation-performing machine. Machine 10 may include a power source 12, a torque converter 14, and a transmission 16 operatively connected to a traction device 18. Machine 10 may also include an operator station 20 and one or more operator interface devices 22 for manual control of machine 10.

Power source 12 may produce a power output and embody an internal combustion engine such as, for example, a diesel engine, a gasoline engine, a gaseous fuel-powered engine, or any other type of engine apparent to one skilled in the art. Power source 12 may, alternatively, embody a non-combustion source of power such as a furnace, a battery, a fuel cell, a motor, or any other suitable source of power.

Torque converter 14 may be a hydraulic device configured to couple power source 12 to transmission 16. Torque converter 14 may allow power source 12 to rotate somewhat independently of transmission 16. It is contemplated that torque converter 14 may, alternatively, embody a non-hydraulic device such as, for example, a mechanical diaphragm clutch.

Figure 2:
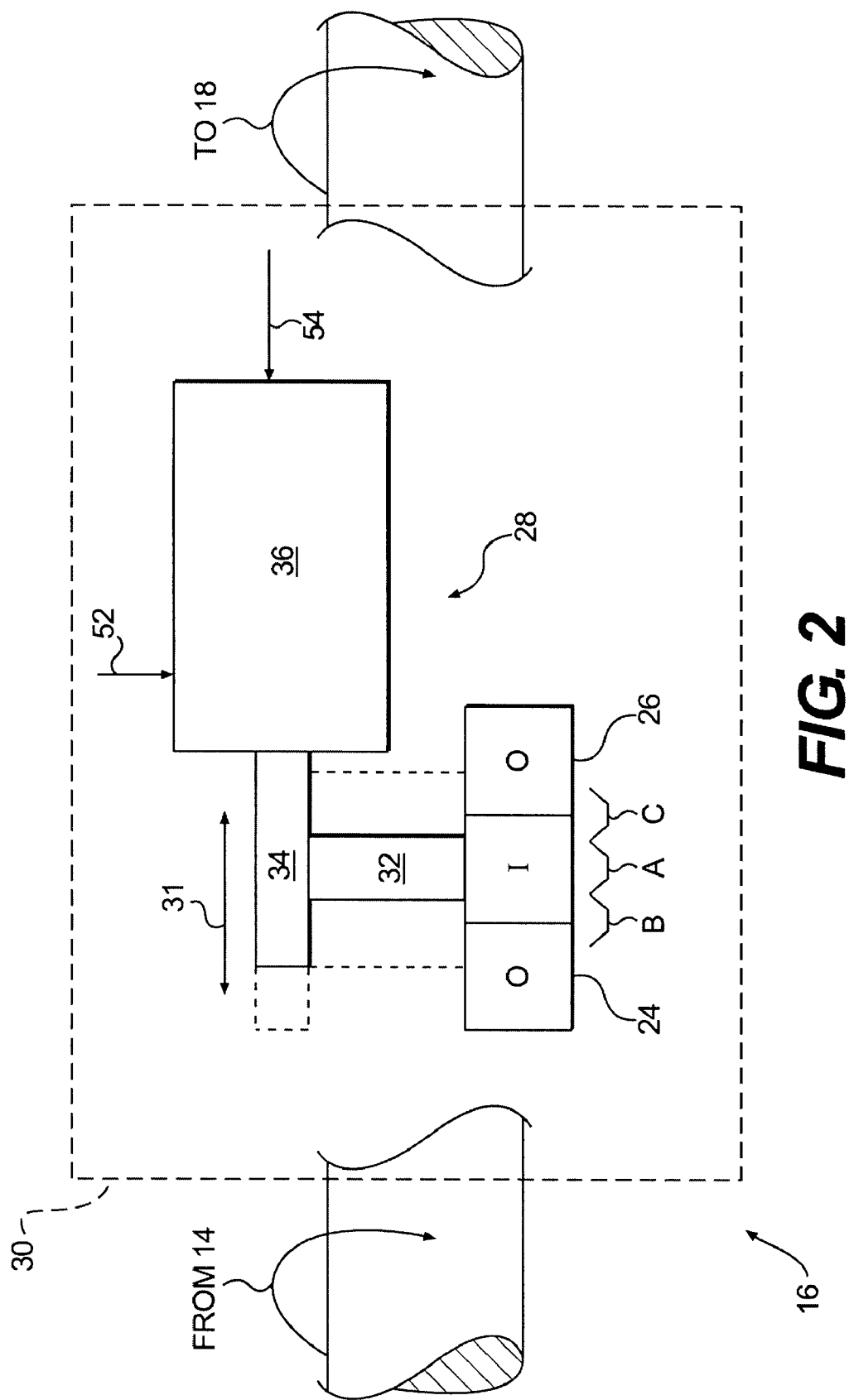
FIG. 2 is a diagrammatic illustration of an exemplary disclosed transmission for use with the machine of FIG. 1.

As illustrated in FIG. 2, transmission 16 may include numerous components that interact to transmit power from power source 12 to traction device 18. In particular, transmission 16 may be multi-speed, bidirectional, mechanical transmission having at least a first combination of gears 24, a second combination of gears 26, and a hydraulic actuator 28 disposed within a common housing 30. Hydraulic actuator 28 may selectively engage the first and second combination of gears 24, 26 and, thereby, transfer power from torque converter 14 to traction device 18 at a corresponding ratio. It is contemplated that multiple hydraulic actuators 28 may be included within transmission 16, if desired, to affect the engagement of additional gear combinations (not shown).

The first and second combinations of gears 24, 26 may be engaged by the movement of a shift collar 32 in the direction of arrow 31. Specifically, hydraulic actuator 28 may move shift collar 32 from a neutral position illustrated in FIG. 2 as "A", to a high speed position illustrated as "B", and to a low speed position illustrated as "C". When in the neutral position, the output from torque converter 14 may be substantially disconnected from traction device 18. When in the high speed position, shift collar 32 may connect the output of torque converter 14 to the input of traction device 18 (e.g., the output of transmission 16) via the first combination of gears 24. When in the low speed position, shift collar 32 may connect the output of torque converter 14 to the input of traction device 18 via the second combination of gears 26.

Figures 3A, 3B, 3C:
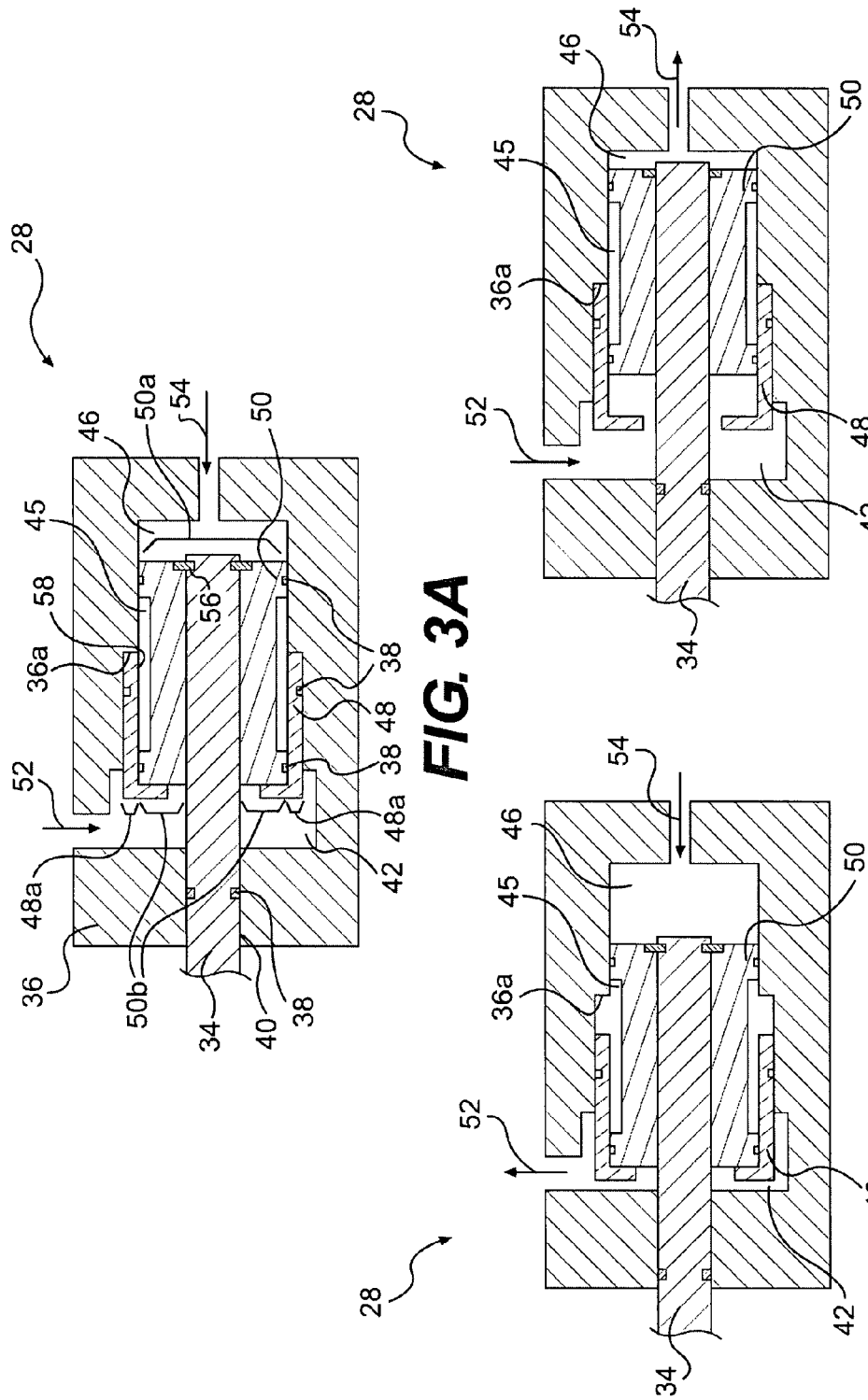
FIG. 3A is a cross-sectional illustration of an exemplary disclosed shift mechanism for use with the transmission of FIG. 2.
FIG. 3B is a cross-sectional illustration of the shift mechanism of FIG. 2A in a second position different from that shown in FIG. 3A.
FIG. 3C is a cross-sectional illustration of the shift mechanism of FIG. 3A in a third position.

Hydraulic actuator 28 may move shift collar 32 by selectively extending and retracting a shift rod 34. In particular, hydraulic actuator 28 may embody a hydraulic cylinder having an actuator housing 36 configured to receive one end of shift rod 34. It is contemplated that actuator housing 36 may be integral with housing 30, if desired, or, alternatively, a separate housing member disposed within or connected to housing 30. As illustrated in FIGS. 3A-3C, a sealing device 38 may be disposed between an opening 40 of actuator housing 36 and shift rod 34 to minimize leakage of fluid from actuator housing 36 as shift rod 34 is extended and retracted.

Actuator housing 36 may be divided into three separate chambers 42, 45, 46 by a first piston 48 and a second piston 50, and supplied with pressurized fluid via two different supply connections 52, 54. First piston 48 may be slidingly disposed about shift rod 34, while second piston 50 may be fixedly connected to shift rod 34 by way of a retention clip 56 or in any other suitable manner. First piston 48 may be generally cup-like, having a central bore 58 configured to receive and limit the motion of second piston 50. Additional sealing devices 38 may be disposed between first piston 48 and second piston 50, between first piston 48 and actuator housing 36, and between second piston 50 and actuator housing 36 to minimize leakage. First chamber 42 may be formed between an end of first piston 48, an end of second piston 50, and a first end of actuator housing 36. Second chamber 45 may be formed by the recessed mid-section of second piston 50, the internal walls of actuator housing 36 and the right hand end of first piston 48. Third chamber 46 may be formed between a second end of second piston 50 and a second end of actuator housing 36. As will be described in more detail below, first and third chambers 42, 46 may be selectively filled and drained of pressurized fluid via supply connections 52, 54 to cause shift rod 34 to move between the three positions (e.g., A, B, and C), thereby changing the output ratio of transmission 16. Second chamber 45 may be continuously connected to a low pressure drain.

Second piston 50 may have two hydraulic surfaces of different areas. In particular, second piston 50 may have a first hydraulic force area 50a and a second hydraulic force area 50b, which is smaller than area 50a. Because shift rod 34 terminates within third chamber 46, the cross sectional area of shift rod 34 may combined with the cross-sectional area of second piston 50 to form first hydraulic force area 50a within third chamber 46. Because shift rod 34 extends through actuator housing 36 the hydraulic force area 50b consists of only the cross-sectional area of second piston 50.

Traction device 18 (referring to FIG. 1) may include wheels located on each side of machine 10 (only one side shown). Alternatively, traction device 18 may include tracks, belts or other driven traction devices. Traction device 18 may be driven by transmission 16 to rotate in accordance with an output rotation of power source 12.

Operator station 20 may receive input from a machine operator. Specifically, operator interface device 22, located within operator station 20, may embody a gear selector provided for operator indication of a desired transmission gear ratio and/or direction of travel. For example, operator interface device 22 may have a neutral position, a plurality of forward gear positions, and a reverse gear position. As the operator moves interface device 22 between the available positions, a desired gear ratio signal may be generated and provided to a transmission controller (not shown). In an automatic-type transmission, as machine travel speed increases, the controller may automatically effect gear shifting (e.g., the extension and retraction of shift rod 34 and shift collar 32 to engage different combinations of gears) in accordance with a shift map until a maximum desired output ratio of transmission 16 is reached. In a manual-type transmission, the controller may effect the exact gear change selected by the operator as the operator makes the selection.

FIGS. 3A-3C illustrate different exemplary positions of shift rod 34 during operation of hydraulic actuator 28. FIGS. 3A-3C will be discussed in the following section to further illustrate the disclosed system and its operation.

INDUSTRIAL APPLICABILITY

The disclosed transmission may provide a simple, inexpensive, and robust way to change output drive ratios between an engine and a traction device. Specifically, the single-end actuator of the disclosed transmission system may have a minimum number of components required to move a shift rod between three different positions. This minimum number of components may reduce the complexity and cost of the disclosed transmission, while improving the reliability thereof. The operation of hydraulic actuator 28 will now be described.

Referring to FIG. 3A, when transmission 16 is in operation, a pump (not shown) may pressurize a fluid in preparation for gear engagement. To achieve a neutral condition within transmission 16, the pressurized fluid may be directed into both of first and third chambers 42 and 46 by way of supply connections 52 and 54, substantially simultaneously.

If the above pressures are applied when first piston 48 and second piston 50 are on the left hand side of the actuator housing 36 as shown in FIG. 3B, then the pressure in first chamber 42 acts on area 48a of first piston 48 and area 50b of second piston 50 and the pressure in third chamber 46 acts on area 50a of second piston 50. Since the pressures are substantially equal and the combined areas 48a and 50b are larger than area 50a, first piston 48, second piston 50 and shift rod 34 move to the right until first piston 48 contacts the stop 36a in housing 36 and neutral position is achieved as shown in FIG. 3A.

Alternatively, if the above pressures are applied when first piston 48 is against stop 36a and second piston 50 is to the right as shown in FIG. 3C then the pressure in first chamber 42 acts on area 50b of second piston 50 and the pressure in third chamber 46 acts on area 50a of second piston 50. Since the pressures are substantially equal and area 50a is larger than 50b then second piston 50 and shift rod 34 move to the left until second piston 50 contacts first piston 48 and neutral position is achieved as shown in FIG. 3A.

It is contemplated that once shift collar 32 has moved to position "A" and the neutral condition is achieved, a soft detent (not shown) may hold shift collar 32 in position "A", allowing first and third chambers 42 and 46 to be emptied of the pressurized fluid. By only supplying pressurized fluid to extend or retract shift rod 34 and not to hold shift rod 34 in a particular position, the efficiency of transmission 16 may be improved.

A machine operator may select a desired transmission output gear ratio or a maximum transmission output speed ratio by moving operator interface device 22. When the operator selects a particular gear ratio or the gear ratio is automatically selected in response to a travel speed or torque and a maximum allowable gear ratio, the pressurized fluid may enter one of first and third chambers 42 and 46, thereby causing shift rod 34 to retract or extend, respectively. For example, as illustrated in FIG. 3B, to achieve the high speed condition, pressurized fluid may be introduced into third chamber 46, while simultaneously draining fluid from first chamber 42, if first chamber 42 is filled with fluid. The pressurized fluid within third chamber 46 may act on hydraulic force area 50a, causing first and second pistons 48 and 50, and shift rod 34 to move to the left. As shift rod 34 moves to the left, shift collar 32 may be moved to position "B" at which the first combination of gears 24 is engaged. Similar to the neutral condition described above, once shift collar 32 has moved to position "B", a soft detent (not shown) may hold shift collar 32 in position "B" to conserve energy.

To achieve the low speed condition, pressurized fluid may be introduced into first chamber 42, while simultaneously draining fluid from third chamber 46, if third chamber 46 is filled with fluid. The pressure within first chamber 42 may urge first piston 48 to the right until it engages stop 36a, while the pressure within first chamber 42 may act on hydraulic force area 50b to continue the movement of second piston 50 and shift rod 34 to the right until the position shown in FIG. 3C is reached. As shift rod 34 moves to the right, shift collar 32 may be moved to position "C" at which the second combination of gears 26 is engaged. Similar to the neutral and high speed conditions described above, once shift collar 32 has moved to position "C", a soft detent (not shown) may hold shift collar 32 in position "C" to conserve energy.

Because the disclosed hydraulic actuator requires only two supply connections to achieve three different shift rod positions, the complexity and cost of transmission 16 may be reduced, while improving the reliability thereof. Specifically, because hydraulic actuator 28 includes only two supply connections, less hydraulic circuitry may be required, as compared to systems employing more than two supply connections. This reduced amount of hydraulic circuitry may result in lower component cost and increased space savings on transmission 16. In addition, because valving may be required to control the flow of pressurized fluid through each supply connection, a reduction in the number of supply connections may result in a similar valving reduction. A valving reduction may further support lower component cost, as well as simplified control of transmission 16. Fewer components and simplified control can result in improved reliability.

It will be apparent to those skilled in the art that various modifications and variations can be made to the transmission of the present disclosure. Other embodiments of the transmission will be apparent to those skilled in the art from consideration of the specification and practice of the invention disclosed herein. For example, although a high speed condition of transmission 16 is illustrated as being achieved through extension of shift rod 34 from actuator housing 36 and a low speed condition achieved through the retraction of shift rod 34, the low speed condition could alternatively be achieved by the extension of shift rod 34 and the high speed condition achieved through the retraction of shift rod 34. It is intended that the specification and examples be considered as exemplary only, with a true scope of the invention being indicated by the following claims and their equivalents.

What is claimed is:

1. A shift mechanism for a transmission having a first combination of gears and a second combination of gears, the shift mechanism comprising:
    a rod member; and
    a hydraulic actuator operatively connected to an end of the rod member and being configured to move the rod member between a first position at which the first combination of gears is engaged to transmit power, a second position at which the second combination of gears is engaged to transmit power, and a third position at which neither the first nor the second combination of gears is engaged to transmit power, the hydraulic actuator including a first piston slidably connected to the rod member, a second piston fixedly connected to the rod member, and a housing configured to receive the first and second pistons to form three chambers, the housing having only two fluid conduits in communication with the three chambers, wherein the first piston does not fully encompass the second piston, and wherein the rod member does not sealingly engage the first piston.

2. The shift mechanism of claim 1, further including a sealing device located between the first and second pistons.

3. The shift mechanism of claim 1, wherein the second piston is slidably received within the first piston.

4. The shift mechanism of claim 1, wherein the first and second pistons are in axial contact when the rod member is in two of the first, second, and third positions.

5. The shift mechanism of claim 4, wherein the first piston, second piston, and housing are in axial contact when the rod member is in the first position.

6. The shift mechanism of claim 1, wherein the second piston is disposed axially about the rod member.

7. The shift mechanism of claim 1, wherein the first piston abuts a stop to separate movement of the first piston with the second piston.

8. The shift mechanism of claim 7, wherein the first piston abuts the stop in both the first and third positions.

9. The shift mechanism of claim 1, wherein the first piston includes a hydraulic force area on only one end thereof.

10. The shift mechanism of claim 1, wherein the second piston includes hydraulic force areas on two ends thereof, and the first piston includes a hydraulic force area on only one end thereof.

11. A transmission, comprising:
a housing;
an input;
an output;
a first combination of gears disposed within the housing an configured to transmit power from the input to the output at a first reduction ratio;
a second combination of gears disposed within the housing and configured to transmit power from the input to the output at a second reduction ratio; and
a shift mechanism configured to selectively engage the first and second combination of gears, the shift mechanism including:
a rod member slidingly received within the housing; and
a hydraulic actuator operatively connected to an end of the rod member and being configured to move the rod member between a first position at which neither the first nor the second combination of gears is engaged to transmit power, a second position at which the first combination of gears is engaged to transmit power, and a third position at which the second combination of gears is engaged to transmit power, the hydraulic actuator including a first piston slidably connected to the rod member, a second piston fixedly connected to the rod member, and a bore within the housing configured to receive the first and second pistons to form three chambers, the housing having only two fluid conduits in communication with the three chambers, wherein the first piston does not fully and sealingly encompass the second piston, and wherein the rod member does not sealing engage the first piston.

12. The transmission of claim 11, wherein the second piston is slidably received within the first piston.

13. The transmission of claim 11, wherein the first and second pistons are in axial contact when the rod member is in two of the first, second, and third positions.

14. The transmission of claim 13, wherein the first piston, second piston, and housing are in axial contact at the first position.

15. The transmission of claim 11, wherein the second piston is disposed axially about the rod member.

16. The transmission of claim 11, wherein the first piston abuts a stop to separate movement of the first piston with the second piston and abuts the stop in both the first and second positions.

17. The transmission of claim 11, wherein the first piston includes a hydraulic force area on only one end thereof.

18. The transmission of claim 11, wherein the second piston includes hydraulic force areas on two ends thereof, and the first piston includes a hydraulic force area on only one end thereof.

* * * * *